United States Patent
Neukermans

(10) Patent No.: US 6,687,430 B2
(45) Date of Patent: Feb. 3, 2004

(54) ARRANGEMENT FOR MULTIPLE 1XN OPTICAL SWITCHES

(76) Inventor: Armand Neukermans, 3 Franciscan Ridge, Portola Valley, CA (US) 94028

( * ) Notice: Subject to any disclaimer, the term of this patent is extended or adjusted under 35 U.S.C. 154(b) by 132 days.

(21) Appl. No.: 09/889,814
(22) PCT Filed: Dec. 1, 2000
(86) PCT No.: PCT/US00/32719
§ 371 (c)(1), (2), (4) Date: Dec. 31, 2001
(87) PCT Pub. No.: WO01/40843
PCT Pub. Date: Jun. 7, 2001

(65) Prior Publication Data
US 2002/0136486 A1 Sep. 26, 2002

Related U.S. Application Data
(60) Provisional application No. 60/168,291, filed on Dec. 1, 1999, and provisional application No. 60/183,116, filed on Feb. 17, 2000.

(51) Int. Cl.[7] ................................................. G02B 6/42
(52) U.S. Cl. ........................... 385/22; 385/18; 385/47
(58) Field of Search ............................. 385/16–24, 47, 385/147

(56) References Cited

U.S. PATENT DOCUMENTS

4,830,452 A * 5/1989 Oxley ........................ 385/17
5,629,790 A   5/1997 Neukermans et al.

FOREIGN PATENT DOCUMENTS

DE   19644918   4/1998
JP   58 159 503   9/1983

OTHER PUBLICATIONS

Lin Y et al., "High–Density Micromachined Polygon Optical Crossconnects Exploiting Network Connection–Symmetry" *IEEE Photonics Technology Letters, US, IEEE Inc., NY*, vol. 10. No. 10, Oct. 1, 1998, pp. 1425–1427.

* cited by examiner

Primary Examiner—Phan T. H. Palmer
(74) Attorney, Agent, or Firm—Fish & Richardson P.C.

(57) ABSTRACT

A fiber optic switch with a plurality of switches, each having one input and N outputs, the switches are arranged and oriented relative to each other so that the input of a switch is in line with the outputs of any adjacent switches of the plurality of switches, wherein each switch includes controllable mirror and has a solid state actuator to directly control the mirror, this facilitating selection of one of a plurality of outputs.

15 Claims, 3 Drawing Sheets

ARRANGEMENT FOR MULTIPLE 1×N OPTICAL SWITCHES

This appln is a 371 of PCT/US00/32719 filed Dec. 1, 2000 and claims the benefit of Prov. No. 60/168,291 filed Dec. 1, 1999 and claims benefit of Prov. No. 60/183,116 filed Feb. 17, 2000.

BACKGROUND OF THE INVENTION

The invention relates to fiber optic switches.

Typically, in the fabrication of dense N×N switches, two N×N switch cores or fabrics are required for redundancy. In each switch core, a signal emanating from an incoming fiber is split and return paths are recombined. Such switching may be implemented with individual switching mechanisms, which select desired paths. As overall switch core size (i.e., the value N) continues to increase, so too does the number of individual switching mechanisms that must be packaged in a single port unit.

SUMMARY OF THE INVENTION

In one aspect of the invention, a fiber optic switch assembly includes a first strip arrangement of deflecting mirrors and a second opposing strip arrangement of deflecting mirrors, the deflecting mirrors in the first and second strip arrangements being configured to operate together to form a plurality of switches.

Embodiments of the invention include one or more of the following features.

Ones of the deflecting mirrors in each strip each can receive an optical beam and provide the optical beam to a selected one of N of the deflecting mirrors in the opposing strip.

Among the advantages of the present invention are the following. The interleaving of 1×N switches provides for a very compact arrangement, thus reducing the overall packaging size of a switch assembly. Such a compact arrangement is of particular interest for fiber optical switching applications that require that many switches be packaged as a single unit.

Other features and advantages of the invention will be apparent from the following detailed description and from the claims.

DETAILED DESCRIPTION

Figure 1:
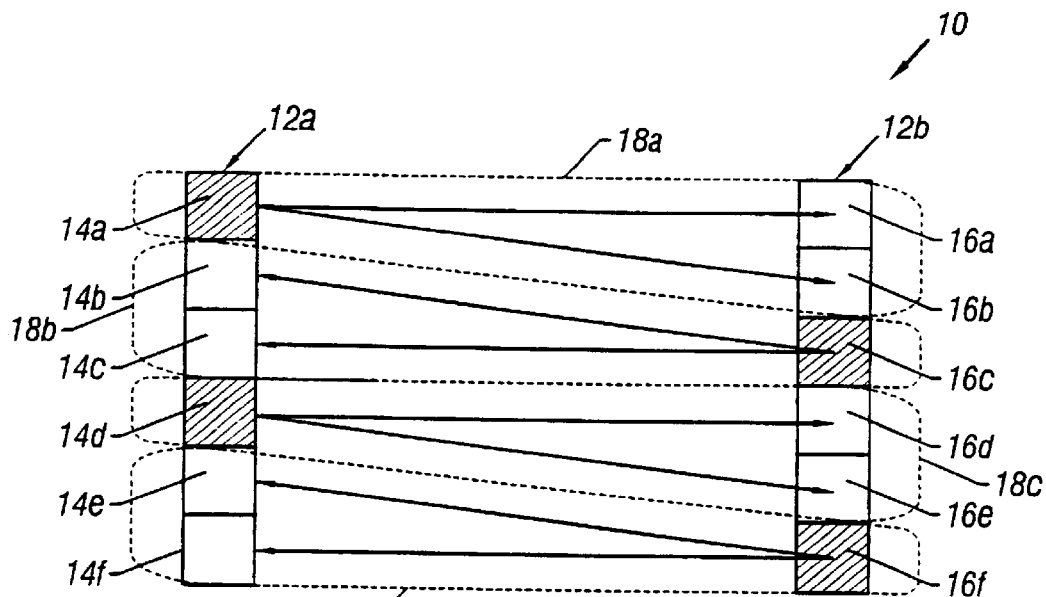
FIG. 1 is an illustration of a switch configured to include four 1×2 switches.

Referring to FIG. 1, a switch 10 includes an arrangement of two arrays or strips 12a, 12b of mirrors 14a, 14b, 14c, 14d, 14d, 14e and 14f, and 16a, 16b, 16c, 16d, 16e and 16f, respectively. The mirrors 14, 16 as described herein are two-dimensional mirrors. Alternatively, the mirrors 14, 16 can be one-dimensional mirrors. The mirrors are grouped to form one input by N outputs (1×N) switches 18, where N has a value of 2. The mirrors 14a, 14d, 16c and 16f serve as inputs and the other mirrors serve as outputs. The mirrors 14a, 16a and 16b form a first switch 18a, the mirrors 16c, 14b and 14c form a second switch 18b, the mirrors 14d, 16d and 16e form a third switch 18c, and the mirrors 16f, 14e and 14f form a fourth switch 18d. Light directed to the mirror 14a in the mirror strip 12a from a launching collimator (not shown) is directed by the mirror 14a towards either of the target mirrors 16a or 16b in the opposing mirror strip 12b. Light falling on the mirror 16c in the mirror strip 12b is directed towards either the mirror 14b or the mirror 14c in the mirror strip 12a. Likewise, the mirror 14d directs a light beam to a selected one of the target mirrors 16c and 16d, and the mirror 16f directs a light beam to a selected one of the target mirrors 14e and 14f. It can be seen from the figure that the switches 18a and 18c have one orientation and the switches 18b and 18d have a second orientation that is the opposite of the first orientation. For a compact arrangement of switches as shown, therefore, the switches having the first orientation are interleaved with the switches having the second orientation. That is, the inputs, 14a, 14d, 16c and 16f of the switches 18a, 18c, 18b and 18d, respectively, are oriented for alignment with outputs of adjacent ones of the switches 18. For example, the input 14a of the switch 18 is in line with the outputs 14b and 14d of adjacent switch 18b, and, likewise, the input 16c of the switch 18b is in line with the outputs 16a, 16b of the switch 18a, as well as the outputs 16de and 16e of the switch 18c, also adjacent to the switch 18b.

Since the target mirrors, e.g., 14e and 14f, are close together, the deflection angles for the mirror from which the beam is deflected (for the example of target mirrors 14e, 14f, that mirror would be the mirror 16f) can be quite small and the driving voltages required for deflection are also very small. For example, if the distance from lens to lens is 50 mm (using a 1.5 mm focal length lens), and the mirror spacing is 1 mm, then the required mirror deflection is only a little more than half a degree. The deflection angle can be further reduced by orienting the beam launching collimator for each 1×2 switch such that the undeflected target position is half way between the two target mirrors, again reducing the angle that needs to be used. Only one deflection direction along the strip needs appreciable deflection. The other direction requires only a very small correction, if the mechanical alignment is done correctly. Of course, and as indicated above, the mirrors could be one-dimensional and therefore deflect in one direction only.

Figure 2A:
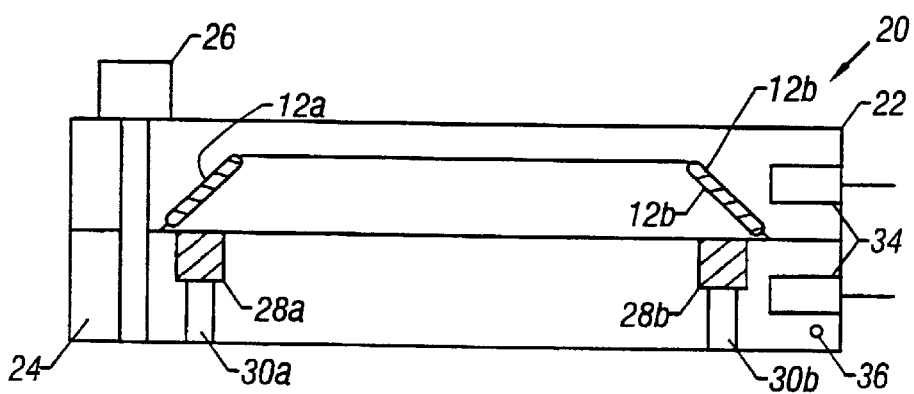
FIG. 2A is a side view of the switch depicted in FIG. 1.
Figure 2B:
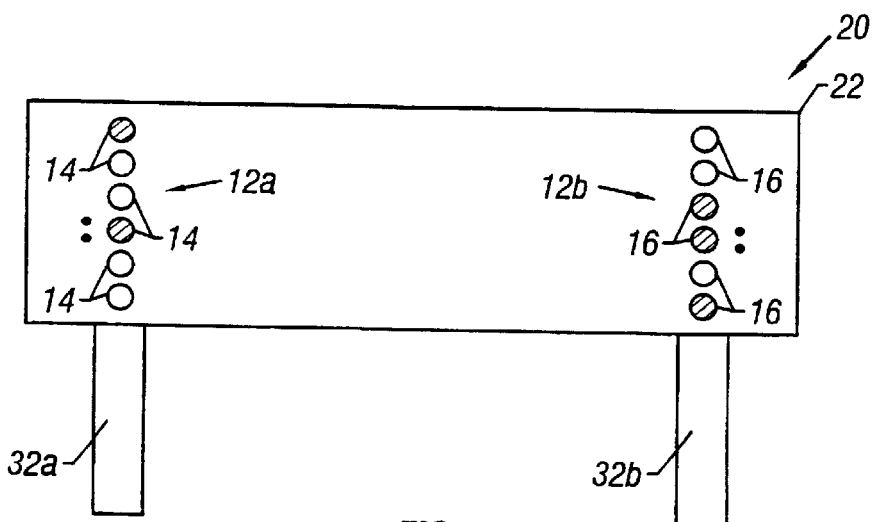
FIG. 2B is a top view of the switch depicted in FIG. 1.

Referring to FIGS. 2A and 2B, an assembly for the switch 10 (of FIG. 1), switch assembly 20, includes two assemblies 22 and 24, which are tightly clamped together with pin 26. Assembly 24 is a monolithic block which holds lenses 28a, 28b and fiber with fiber ferrules 30a, 30b, which are adjusted against each other to produce maximum throw of the waist coming out of the fiber at the end of the ferrules 30a, 30b. The assembly 22 holds the mirror strips 12a and 12b (that include associated substrates, e.g., silicon, ceramic, glass, etc.), which have connecting ribbons 32a and 32b for their leads. The assembly 20 further includes heaters 34 and a temperature sensor 36 to provide a stabilized thermal environment. The switch assembly 20 may be thermally isolated from its environment with an insulated jacket (not illustrated).

Figure 3A:
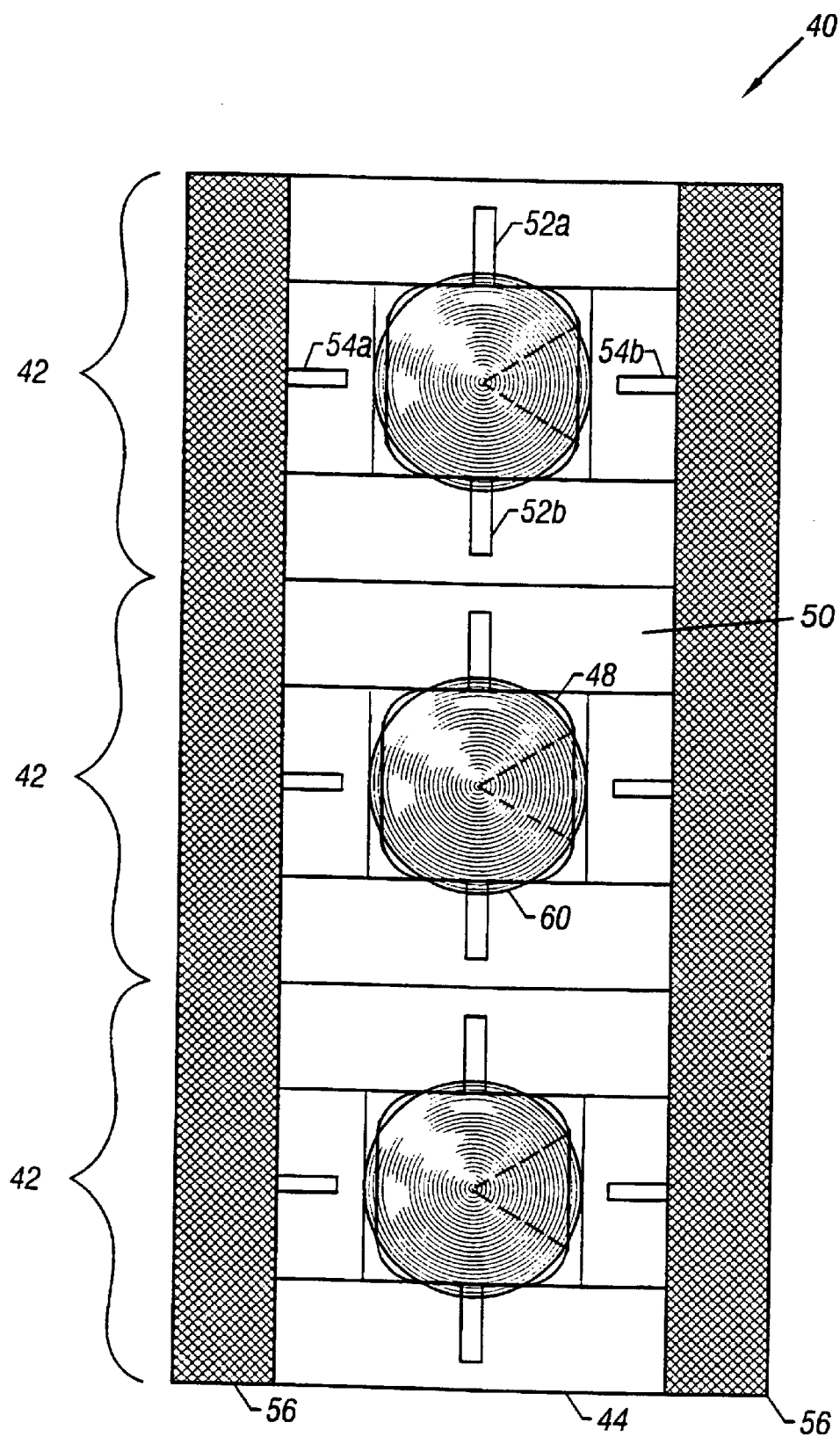
FIGS. 3A and 3B are top and side views, respectively, of an exemplary mirror structure.
Figure 3B:
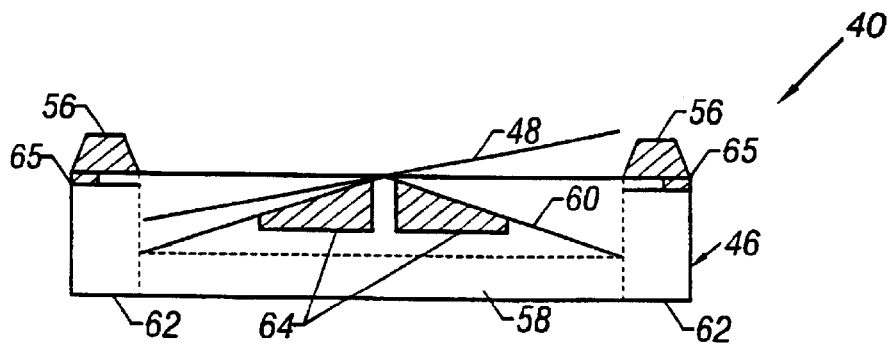

With reference to FIGS. 3A–3B, an exemplary mirror strip structure 40 for implementing the mirror strips 12a, 12b is shown in partial view. The mirror strip structure 40 includes micro-mirror structures 42 (which correspond to the mirrors 14, 16 in FIG. 1), each of the micro-mirror structures 42 including a mirror arrangement 44 disposed above and supported over a top surface of a reference member or substrate 46. To illustrate the detail of the mirror structures 42, only three are shown in the figure. It will be appreciated that there would be six micro-mirror structures 42 in each of the strips 12*a*, 12*b* in the switch 10 of FIG. 1. As shown in FIG. 3A, each mirror arrangement 44 includes a mirror 48 coupled to mirror frame 50 by a first pair of torsion members 52*a*, 52*b*. The mirror arrangement 44 further includes a second pair of torsion members 54*a*, 54*b*, which couple the mirror frame 50 to strips 56.

Referring to FIG. 3B, the substrate 46 includes a base portion 58, a raised portion 60 on the base portion 58, and sidewall portions 62 on either side of the base portion 58. The substrate may be made of ceramic or other suitable materials. The strips 56 are located on top of the sidewalls 62. As shown by the raised portion 60 (FIG. 3A), the raised portion 60 is conical or quasi-conical in shape.

Electrodes 64 are disposed on the surface of the raised portion 60 to impart a rotational motion to the mirror 48 and the mirror frame 50 (shown in FIG. 3A). The electrodes 64 control the inner rotation of the mirror arrangement around the torsion members 52*a*, 52*b* ("x-axis"), as well as control the outer rotation of the mirror arrangement around the torsion members 54*a*, 54*b* ("y-axis").

Preferably, for large deflection angles and small driving voltages, the mirror structure includes the raised portion 60 as described and, although the raised portion 60 has been thus described as having a cone or cone-like form, it may take any shape or structure that allows the electrodes 64 to be positioned close to the mirror arrangement 44 and support rotational movement of the mirror arrangement in the x-y plane. It will be understood, however, that although the raised portion may be desirable, any other electrode structure or structure for supporting electrodes can be used. For example, planar electrodes can be used.

Preferably, the mirror arrangement 14 and the electrodes 34 are so positioned relative to the cone 30 such that the cone 30 is centered approximately under the mirror 18. Substrate areas beneath the mirror frame 20 need not be conical, but may be sloped on such an angle as required to allow the mirror arrangement 14 to rotate freely through its outer axis of rotation around torsion members 24*a*, 24*b*. These substrate areas can be machined linearly in the substrate 16, thus simplifying the fabrication of the substrate 16.

As can be seen in FIG. 3B, a spacer 65 can be used between each of the strips 56 and the sidewall portions 62 of the substrate 46 below such strips 56. The angles in the bottom of the substrate 12 are not critical. Typically, because the substrate 16 is made in sections of 4.5"×4.5", the sections are all made together. The substrate material may be machined in vertical and horizontal directions to remove material under a desired angle. The cone or cone-like shape is ground on the top to complete the substrate structure or can be etched into the substrate surface. Alternatively, a mold may be made to cast the substrate material in a green state. In yet another alternative, the electrodes can be plated onto the substrate surface.

The mirror structure 42 can be fabricated using silicon-on-insulator fabrication techniques, with the mirror arrangement 44 being defined in the top (or device) silicon wafer. Other fabrication techniques may be used.

The embodiment of the mirror structure 42 illustrated in FIGS. 3A–3B and various associated fabrication techniques are described more fully in co-pending U.S. patent application Ser. No. 60/165,863, entitled "Improvements for an Optical N×N Switch", filed on Nov. 16, 1999, incorporated herein by reference.

Other structures (such as mirror structures having different electrode structures, as mentioned above) may be used. For example, the mirror strips 12*a*, 12*b*, and their associated mirror structures 14, 16, respectively, may be constructed in accordance with the techniques described in U.S. Pat. Nos. 6,044,705 and 5,629,790, incorporated herein by reference. Other known two-dimensional micro-machined mirror structures may be used.

The deflection of mirrors 14, 16 can be driven by a closed loop system. If desired, angle deflection sensors may be used to control deflection, as described in the above-mentioned application and patents. The deflection may be electrostatic or magnetic or both, in either direction. For example, the axis having the relatively large deflection may be magnetic and the relatively smaller deflection axis could be electrostatic, since the latter requires only minor correction. Thus, even if the mirrors are spaced far apart from each other, there is little possibility of electrostatic instability.

Figure 4:
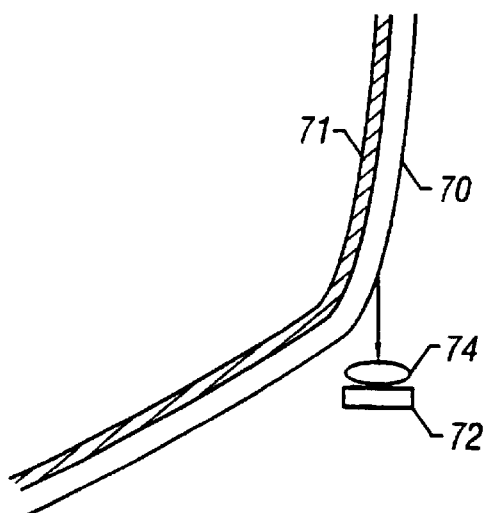
FIG. 4 is an illustration of a detector arrangement to optimize coupling for each switching path in the switch of FIGS. 1 and 2A–2B.

Alternatively, the deflectors may be driven open loop, or an external alignment scheme may be used. For example, and referring to FIG. 4, a fiber 70 exiting the collimator 30*b* (from FIG. 2A) is bent, possibly around a mandrel 71, and produces radiation which is collected and imaged on a detector 72 with a simple lens (e.g., plastic) or Fresnel lens 74. By dithering the driving voltages or currents of the deflecting mirrors through very small angles and detecting with phase sensitive detection a maximum value for the transmitted power peak (using the detector 72), the mirrors 14, 16 can be locked into an optimum deflection position for transmission of light from one fiber to another.

Although the interleaving scheme is described above with reference to 1×2 switches, it is equally applicable to switches of any size 1×N, where N is a value of two or greater. Additionally, although the switch 10 is depicted as having four 1×N (where N=2) switches, the switch 10 could include more or less than the four 1×N switches that are shown.

The switches 18 have been thus described as having a single input and N outputs. Alternatively, the switches 18 may have N inputs and one output, or may be operated in two modes so that the mirrors serving as inputs and mirrors serving as outputs in one mode serve as outputs and inputs, respectively, in a second mode. For example, and again referring to FIG. 1, the switches 18 can be operated to use the mirrors 14*b*–14*c*, 14*e*, 14*f*, 16*a*, 16*b*, 16*d*, 16*e* as inputs and the mirrors 14*a*, 14*d*, 16*c* and 16*f* as outputs. Thus, each of the 1×2 switches could have two inputs and one output and thus select one of the input signals (that is, the optical beams) received at a corresponding one of the two input mirrors to be directed to the single output mirror.

Figure 5:
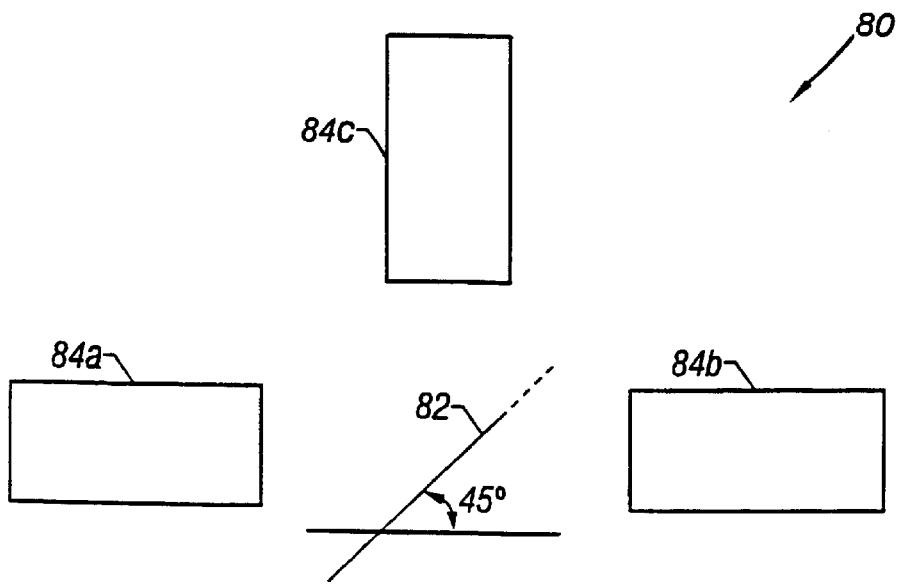
FIG. 5 is an illustration of an alternative 1×2 switch arrangement that uses a latching switch element.

Other embodiments of a 1×2 switch for use in a switch including a plurality of 1×2 switches, such as the switch 10, are contemplated. For example, and referring to FIG. 5, a 1×2 switch can be implemented with a single latching switch element 82 arranged in a configuration with collimator and fiber assemblies (hereinafter, collimators) 84*a*–84*c*, shown as switch 80. The collimator 84*a* serves a launching collimator and the collimators 84*b* and 84*c* serve as exiting collimators. Each of the collimators 84 is coupled to one or the other of the mirror strips 12*a*, 12*b*, and are preferably situated in "V" shaped grooves in the silicon substrate. The latching switch element 82 may be implemented with magnetic actuating and electrostatic clamping, as described in co-pending U.S. patent application Ser. No. 09/388,772, incorporated herein by reference.

The operation of the switch 80 is as follows. When the latching switch element 82 is not activated, the optical beam path is from the collimator 84a to the collimator 84b. When the latching switch element 82 is activated (by electrostatic clamping) for positioning at a 45 degree angle as shown, a beam from the collimator 84a is directed not to the collimator 84b but instead to the collimator 84c. Although the latching switch element 82 is clamped electrostatically in a particular position, minor adjustments in the position can still be made, as described in the above-referenced U.S. patent application Ser. No. 09/388,772. The mechanical location of the latching switch element 82 relative to the collimators 84 can vary, as the associated mirror may be tilted and adjusted appropriately in two directions when switching is performed.

OTHER EMBODIMENTS

It is to be understood that while the invention has been described in conjunction with the detailed description thereof, the foregoing description is intended to illustrate and not limit the scope of the invention, which is defined by the scope of the appended claims. Other embodiments are within the scope of the following claims.

What is claimed is:

1. A fiber optic switch, comprising:
   a plurality of switches, each having one input and N outputs, the switches are arranged and oriented relative to each other so that the input of a switch is in line with the outputs of any adjacent switches of the plurality of switches, wherein each switch includes a controllable mirror and has a solid state actuator to directly control the mirror, thus facilitating selection of one of a plurality of outputs.

2. The fiber optic switch of claim 1, wherein each switch comprises deflecting mirrors configured to form switching paths.

3. The fiber optic switch of claim 2, wherein the deflecting mirrors include a mirror suspended above a substrate and driving devices disposed in the substrate for causing the mirror to rotate in two axes of direction.

4. The fiber optic switch of claim 2, wherein each deflecting mirror is locked in an optimum deflection angle based on a power peak detection value determined at a fiber receiving light from such mirror.

5. The fiber optic switch of claim 1, wherein the arrangement and orientation of the switches results in a compact arrangement of the plurality of switches.

6. The fiber optic switch of claim 1, wherein said solid state actuator is an electrode.

7. A fiber optic switch assembly, comprising:
   a first strip arrangement of deflecting mirrors;
   a second opposing strip arrangement of deflecting mirrors; and
   wherein the deflecting mirrors in the first and second strip arrangements are configured to operate together to form a plurality of switches, wherein each deflecting mirror is a controllable mirror and includes a solid state actuator to directly control the mirror, thus facilitating switching.

8. The fiber optic switch assembly of claim 7, wherein ones of the deflecting mirrors in each strip each receive an optical beam and provide the optical beam to a selected one of N of the deflecting mirrors in the opposing strip.

9. The fiber optic switch assembly of claim 7, wherein each deflecting mirror is locked in an optimum position based on a power peak detection value determined at a fiber receiving light from such mirror.

10. The fiber optic switch assembly of claim 7, wherein each deflecting mirror comprises a structure including a mirror suspended above a substrate and driving devices disposed in the substrate for causing the mirror to rotate in two axes of direction.

11. The fiber optic switch assembly of claim 7, wherein the first strip arrangement comprises at least two inputs spaced apart by at least a pair of outputs and the second strip arrangement comprises at least two pairs of outputs spaced apart by an input.

12. The fiber optic switch assembly of claim 7, wherein said solid state actuator is an electrode.

13. A fiber optic switch arrangement comprising:
   a plurality of mirrors arranged to form switching paths between one mirror in the plurality of mirrors and N other mirrors in the plurality of; wherein each mirror is a controllable mirror and includes a solid state actuator to directly control the mirror, thus facilitating switching;
   wherein, in a first mode of operation, the one mirror serves as an input and the N other mirrors serve, as outputs such that the one mirror directs an optical beam to the one of N other mirrors and, in a second mode of operation, the one mirror serves as an output and the N other mirrors serve as inputs such that the one mirror receives an optical beam from one of the N other mirrors.

14. The fiber optic switch assembly of claim 13, wherein said solid state actuator is an electrode.

15. A fiber optic switch arrangement comprising:
   three collimators, one serving as a launching collimator and others serving as exit collimators;
   a latching switch element having first and second positions, an optical beam emanating from the launching collimator being directed directly to a first one of the exit collimators when the latching element is in the first position, and optical beam emanating from the launching collimator being deflected by the latching switch element to a second one of the exit collimators when the latching switch element is in the second position.

* * * * *